Figure 1:
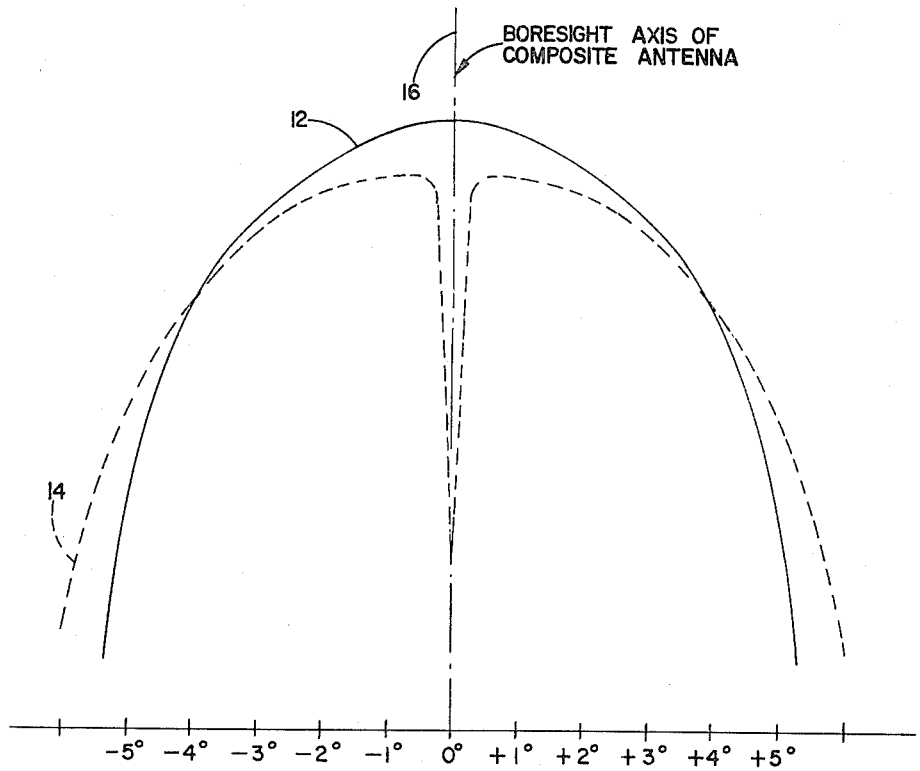

Jan. 11, 1966    B. L. STINE    3,229,289
MICROWAVE MONOPULSE SIMULATION APPARATUS
Filed June 27, 1963    3 Sheets-Sheet 1

INVENTOR.
BILLY L. STINE
BY Sidney Magnes
AGENT

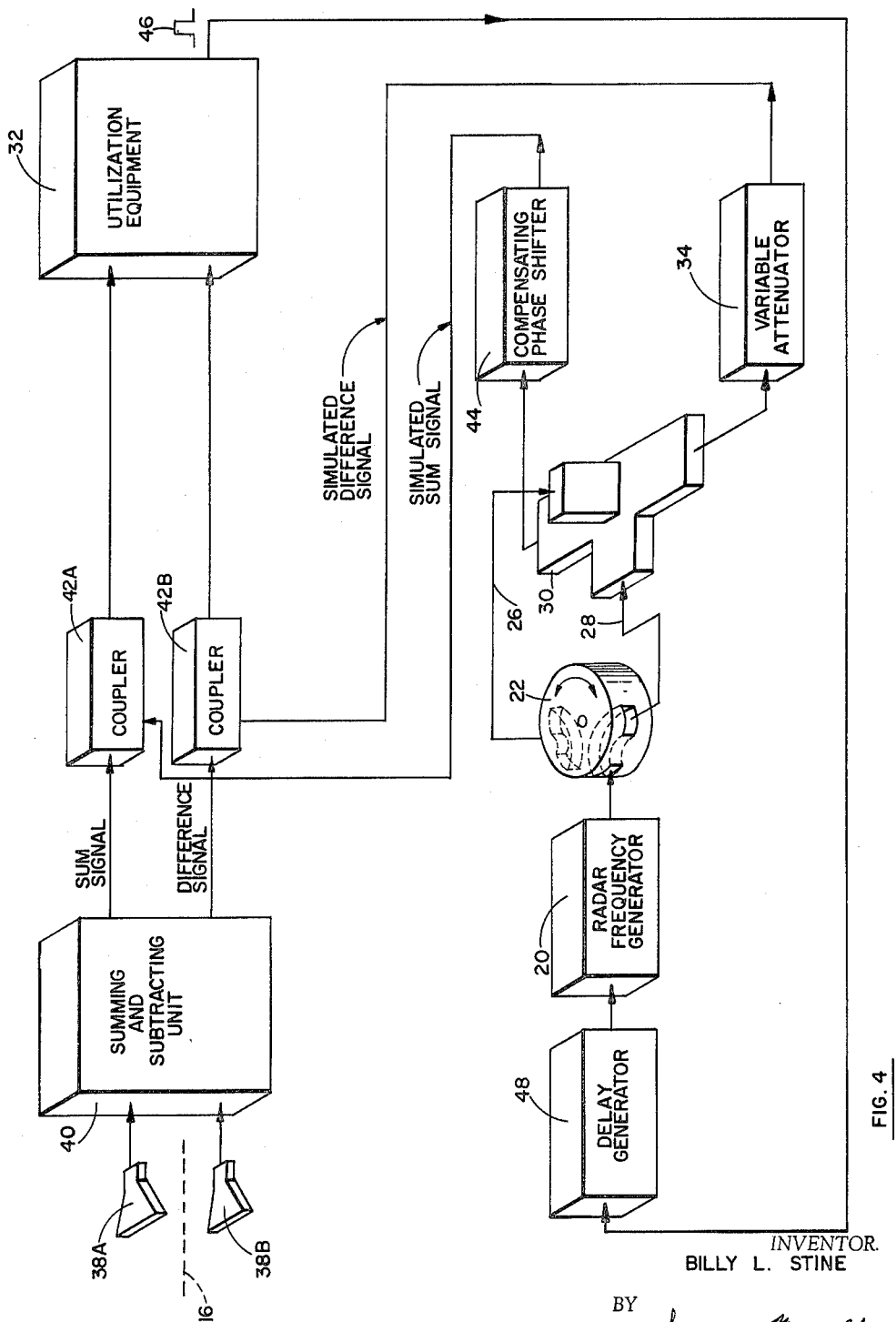

United States Patent Office 3,229,289
Patented Jan. 11, 1966

3,229,289
MICROWAVE MONOPULSE SIMULATION
APPARATUS
Billy L. Stine, La Mirada, Calif., assignor to North
American Aviation, Inc.
Filed June 27, 1963, Ser. No. 291,018
2 Claims. (Cl. 343—17.7)

This invention relates to radar system; and more particularly to the calibration of accessory equipment that indicates the orientation of a monopulse radar antenna.

Background

It is well known that radar is used to detect the presence and the position of targets. In operation, radar energy is emitted by a radar antenna, and impinges upon a target. A portion of the impinging energy is reflected by the target, and is received as an "echo" signal by the radar antenna. The time interval between the transmission of the energy and the reception of the echo signal is thus an indication of the distance, or "range," to the target.

While the basic concept of radar easily provides the range to the target, it is somewhat more difficult to obtain the angular position of the target relative to the radar station. In one system, the radar antenna is rotated slowly; and its orientation when an echo signal is received indicates the direction of the target.

The increasing need for more precise radar angular measurements led to the need for precise accessory equipment to indicate the direction of the target; and it became essential that the accessory equipment be periodically checked and re-calibrated, in order to assure the dependability of the radar system.

It is therefore the principal object of the invention to provide an improved method and means for calibrating a radar antenna's angular position.

Figure 5:
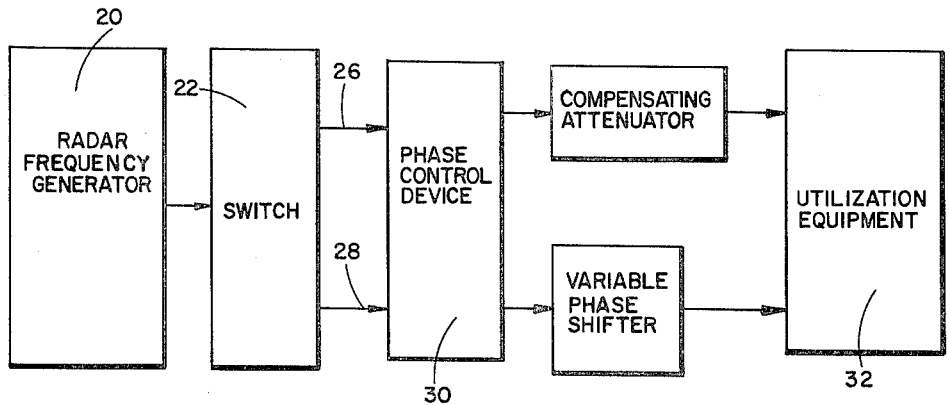
Figure 2:
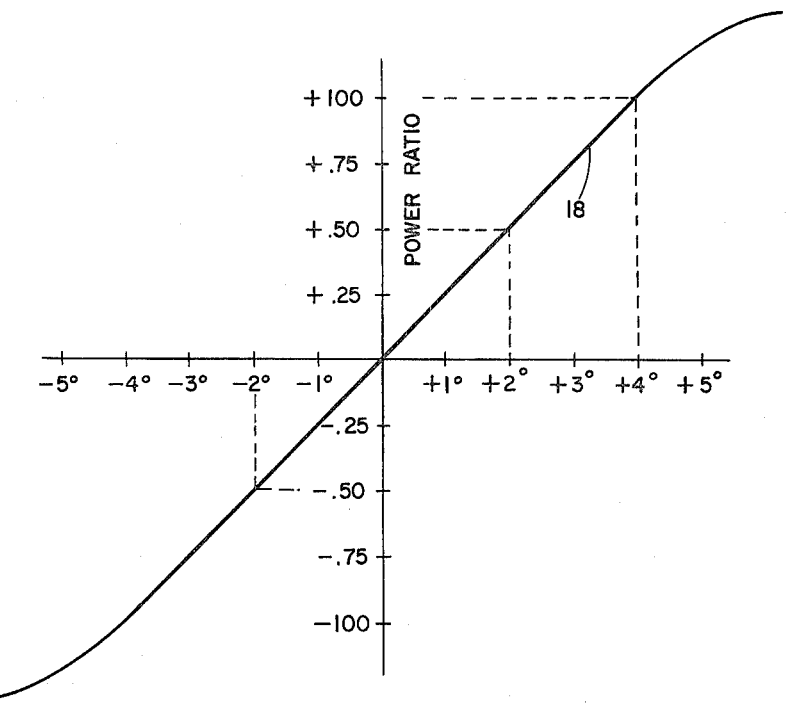
Figure 3:
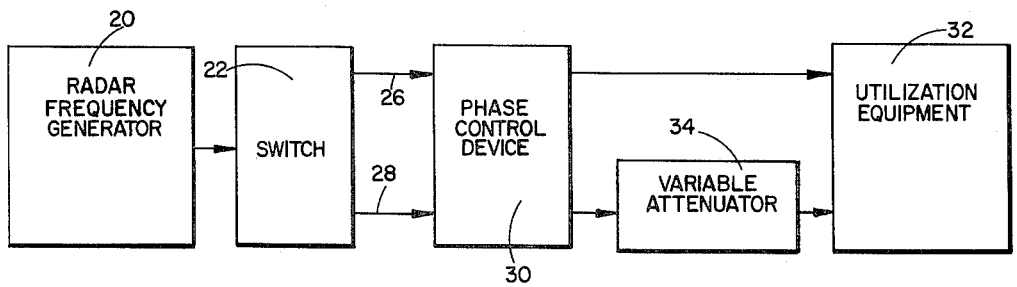

The attainment of this object and others will be realized from the following specification, taken in conjunction with the drawing of which:

FIGURE 1 shows various response patterns;
FIGURE 2 shows the power-ratio chart;
FIGURE 3 shows a schematic representation of the invention;
FIGURE 4 shows a diagrammatic representation of the invention; and
FIGURE 5 shows another schematic representation of the invention.

Introduction

At this point it will be helpful to understand the operation of the sum-and-difference radar system, which is often used to provide the range and the direction of a target.

This system uses a composite antenna that, for simplicity, will be explained in term of two individual antennas positioned alongside each other. When a target reflects radar energy back to the composite antenna, each individual antenna picks up its own individual echo signal; and produces its own individual output signal. As indicated by the name (sum-and-difference) of the system, the individual signals from the individual antennas are summed, or added together to produce a "sum" signal that is processed in a particular way to provide target range information. Simultaneously, the individual signals from the individual antennas are subtracted from each other to produce a "difference" signal that is processed in a particular way to provide target-direction information.

FIGURE 1 shows, in solid lines, the sum-signal pattern 12 produced by the composite antenna; and shows, in dotted, lines the difference-signal pattern 14 produced by the composite antenna. These patterns show the intensity of the signal for various angular positions of the target relative to the central, or "boresight" axis, 16 of the composite antenna.

If the intensity of the sum and difference signals for each angular position of the target are measured, and the value of the difference-signal is divided by the value of the corresponding sum-signal, the quotient is called the "power-ratio," and the resultant graph of the power-ratios appears as the power-ratio-line 18 of FIGURE 2. Generally, the power-ratio-line 18 is a substantially straight line (linear) between the values of about −4° to +4°; and departs from linearity beyond these points.

It is a characteristic of the sum-and-difference system, that when the target is to one side of the boresight axis of the antenna—as indicated by the "negative" angles—the signals have a different "phase" relation than when the target is on the other side of the boresight axis of the antenna—as indicated by the "positive" angles. Thus, the power-ratio is shown as being positive (above the horizontal line) for positive angles, and is shown as being negative (below the horizontal line) for negative angles.

If a target's sum-signal and difference-signal produce a given power-ratio, the power-ratio-line 18 of FIGURE 2 will indicate the angular direction to the target, relative to the antenna. Moreover, a positive-valued power-ratio indicates a target to one side (say the right side) of the antenna's boresight axis; while a negative-valued power-ratio indicates a target to the other side (say the left side) of the antenna's boresight axis.

In this way, a particular power-ratio indicates a particular angular direction to the target.

Each antenna has a power-ratio-line characteristic of its design; and if the manufacturer makes a plurality of antennas of a given design, each antenna is adjusted so that its power-ratio-line corresponds to the others of that design. Thus, while different types of antennas have different power-ratio-lines, the antenna of a particular type has a power-ratio-line that corresponds to the power-ratio-line of that type.

As may be realized, setting up a radar station is a complex undertaking, involving the problem of combining and interconnecting numerous componets obtained from a plurality of vendors. For example, the antenna is generally produced by a manufacturer that specializes in large structural devices; the equipment for indicating the direction to the target is generally produced by a manufacturer that specializes in electronic computers; and the equipment that correlates the various elements of the system is frequently made and assembled by still another vendor. As part of the establishment of the overall system at the desired location, all of the various components must be adjusted so that each performs its specific function of the overall system.

When the manufacturer of the antenna delivers his product, it is accompanied by a power-ratio-line chart for that particular antenna or type of antenna. The chart is obtained as follows.

When the antenna manufacturer finishes the structure, he calibrates it by mounting it on an angle-indicating device, and uses a radar-reflecting target positioned a given distance away on a so-called "radar tower." The antenna circuitry is then energized, and measurements are made of the echo signals for each angular orientation of the target relative to the boresight axis of the antenna. These are then used to provide the power-ratio-line of that antenna.

Alternatively, a radar-energy emitting source, known as a radar "beacon" may be positioned on the radar tower to act as the "target." It will be noted that these calibrating systems have actual incoming radar signals.

When the antenna is incorporated into the radar station, it is associated with utilization equipment that should indicate the direction to the target. It now becomes necessary to calibrate the system.

To do this, the antenna is positioned at a particular orientation relative to a target or a beacon mounted on a radar tower; and the sum-and-difference signals are measured for that orientation. When the power-ratio for a given antenna orientation is +1, the manufacturer's power-ratio-line chart of FIGURE 2 indicates that the angular orientation of the target is +4°. If the utilization equipment indicates anything except +4°, adjustments are made until a +4° reading is obtained.

The same procedure is followed for other orientations of the antenna, until eventually the equipment is properly calibrated to give the correct orientation angle for every power-ratio in the desired angular range.

It will be understood that calibrating the equipment is a time-consuming, tedious, and painstaking operation. In addition, it requires one or more radar towers that are fixedly positioned in a predetermined manner with respect to the radar antenna.

There are many cases when the above calibration procedure is difficult, or impossible. For example, in the case of a ship at sea, the continual buffeting requires that the calibration be re-checked periodically; but also introduces the problem that the ship is constantly flexing, and does not have a stable radar tower for the calibration procedure. Another disadvantage is the necessity for having a radar tower on the ship, as this may be extremely undesirable. Moreover, on military ships the above-described calibrating procedure requires that the ship break radar silence in order to perform the calibration; and this may indicate the ship's presence to an enemy, or may interfere with the operation or calibration of other radar systems.

Land-based radar installations may be too new or temporary to have radar towers; or it may be undesirable to have radar towers in the vicinity of an airport.

Synopsis

Broadly speaking, the present inventive concept contemplates equipment for simulating incoming radar signals, the simulated signals being capable of having a selected characteristic varied to provide any desired ratio. Each ratio produced by the present invention corresponds to a point on the ratio-line chart provided by the antenna manufacturer; and these artificially-produced ratios may be used to calibrate the utilization equipment to indicate the correct angular orientation for that particular power-ratio and antenna.

In this way, a ship can dispense with radar towers; may quickly and easily verify or check the calibration of the radar system; and, where desired, may still maintain radar silence. Moreover, land-based installations can dispense with radar towers.

Description of the invention

The basic inventive concept may be understood from FIGURE 3, which is a schematic diagram of apparatus for simulating sum-and-difference signals.

In operation, a radar frequency generator 20, which may be the same generator that supplies the energy for the radar system, produces suitable electrical signals. The signals from generator 20 are applied to a switch 22 that directs the electrical signals to either of two channels 26 or 28 depending upon the desired result. This will be explained later, in greater detail. The signals from channels 26 or 28 are applied to a phase-control device 30, such as a "magic tee."

As is well known, a magic tee is a type of phase-control device that generally has four ports, or terminals, that accept or emit electrical signals. If the incoming signals are applied to a particular input port, the energy is split, and two output ports each emit half of the energy in an in-phase relation. (An in-phase relation may be visualized as two swings maintaining a side-by-side relation.)

If the incoming signals are applied to a second input port, the energy is also split, but now the two output ports each emit half of the energy in an anti-phase relation, which may be visualized as two swings swinging in opposite directions.

Magic tees are well known, and therefore their operation will not be explained in detail; but for the present purposes it will suffice to know that a magic tee produces two equal output signals that may either be in-phase or anti-phase.

One output signal from magic tee 30 is fed directly to utilization equipment 32; while the other output signal from magic tee 30 is passed through a variable attenuator 32, wherein the signal has its intensity reduced a selectable amount; and is then applied to utilization equipment 32.

Operation of the invention

The apparatus of FIGURE 3 operates as follows.

Assuming a suitable setting for switch 22, the energy from generator 20 passes through switch 22, along channel 26, and is applied to phase-control device 30.

For the assumed setting of switch 22, equal and in-phase signals are produced at the two output ports of phase-control device 30. As previously indicated, one output signal is fed directly to utilization equipment 32. The other output signal passes through a variable attenuator 34, where it is attenuated.

As a result of the operation of the device, utilization equipment 32 received two signals; one of which is of full strength; while the other has been attenuated to a desired degree.

Of the two signals applied to utilization equipment 32, the full-strength direct signal may be considered to be the sum-signal from a radar target; and the attenuated signal may be considered to be the difference-signal from the same radar target. Depending upon the attenuation introduced, the intensity relation between the simulated difference-signal and the simulated sum-signal may have any desired ratio; thus corresponding to the power-ratio for a target at any desired direction relative to the boresight axis of the antenna.

Since, as previously explained a, given power-ratio corresponds to a given target direction, the various power-ratios produced by the present invention simulate various targets at various angular directions.

Variable attenuator 34 may be suitably calibrated in terms of its attenuation, so that its dial may read in terms of percent of attenuation. Thus, if the variable attenuator dial is set at 50%, this means that the simulated difference-signal is 50% of the simulated sum-signal; thus a power-ratio of +.50 is produced.

Reference to the manufacturer's power-ratio chart of FIGURE 2 indicates that a +.50 power-ratio should be obtained at +2°. Therefore the utilization equipment 32 is adjusted so that a reading +2° is obtained.

Similarly, the variable attenuator 34 may be set so that it does not introduce any attenuation. At this setting the simulated difference-signal is equal to the simulated sum-signal; producing a +1.00 power-ratio. Reference to the manufacturer's chart of FIGURE 2 indicates that this +1.00 power-ratio corresponds to an angular orientation of +4°; and the utilization equipment 32 is then adjusted so that it reads +4°.

It may thus be seen that the present invention provides simulated radar signals that simulate the incoming radar signals produced by an actual target, a calibrating target on a radar tower, or a radar beacon; the latter three cases producing actual incoming radar signals. Moreover, the invention permits any desired power-ratio to be obtained, without the necessity of actually transmitting power outward and receiving the echo signal from a target, or using a radar-beacon.

It was previously indicated that a target on one side of the antenna's boresight axis produces a signal having an opposite phase to the signal produced by a target on the other side of the antenna's boresight axis.

The present device simulates a target on the other side of the boresight axis by setting switch 22 to its other position.

At this setting, energy passes along channel 28. Under this condition the inherent operation of phase-control device 30 is such that equal but oppositely-phased output signals are obtained. Now the simulated sum-signal is the same as it was for the other position of switch 22; but the simulated difference-signal has an opposite phase.

The resultant power-ratio now has an opposite sign, compared to that produced when switch 22 was in its first setting. As a result, a setting of 50% for the variable attenuator 34 now produces a negative-valued −.50 power-ratio.

Reference to the antenna manufacturer's power-ratio chart of FIGURE 2 indicates that the power ratio of −.50 corresponds to a setting of −2°; and the utilization equipment 32 is now adjusted to produce this reading.

FIGURE 4 shows a diagrammatic illustration of the invention.

Here two individual antenna "horns" 38 form a composite antenna having a boresight axis 16. If desired, a radar reflector-type antenna (not illustrated) may be used. In actual radar usage, the incoming radar signals impinging onto antennas 38 are applied to a summing and subtracting unit 40, that may comprise devices such as magic tees. (Magic tees have the additional characteristic that, besides splitting incoming signals, they can also sum or subtract two input signals.) The true sum-signal and the true difference from unit 40 contain information about an actual target; and are applied to utilization equipment 32.

For calibration purposes, the previously-described simulated signals are used instead of the true signals. As previously explained, the energy from generator 20 is applied to a microwave switch 22, that may comprise a hinged waveguide that pivots to direct the energy to waveguide 26 or to waveguide 28. Alternatively, switch 22 may comprise a rotatable disc that has two separate channels, the setting of switch 22 determining whether the energy is appled to waveguide 26 or 28. Switches of this type are commercially available; for example Model W91–M1E2–W made by Waveguide, Inc.

The output of switch 22 is applied to phase-control device 30. While a magic tee is illustrated, other devices may be used. For example, a coupler may be used to split the incoming energy and direct it to two separate paths; which may have phase-shifters to provide in-phase or anti-phase signals.

Phase-shifters generally operate by inserting into the path of the energy, materials that vary the phase of the output signal. Thus, for the phase-control device 30, a given amount of such material may be inserted or withdrawn to provide in-phase or anti-phase signals.

One output of the phase control device 30 is applied to variable attenuator 34, which controls the intensity of the signal to form the simulated difference-signal.

Attenuators generally operate by inserting a "lossy" material in the path of the signal, the lossy material absorbing energy, and thus reducing the output signals. Such devices are also commercially available, for example model P382 of the Hewlett Packard Co.

The previous discussion implied that variable attenuator 34 attenuated the incoming signal without introducing any phase shift. In actuality, most commercially-available attenuators do introduce a slight phase shift; and for this reason, a compensating phase-shifter 44 is used, so that the simulated difference-signal may have exactly the same phase as the simulated sum-signal for one setting of waveguide switch 22; and may have an exactly opposte phase compared to the simulated sum-signal for the other setting of waveguide switch 22.

Phase-shifter 44 is shown in the direct path between phase-control unit 30 and the utilization device; but it may alternatively be positioned in the attenuating path.

Phase-shifters are also commercially available, for example model P885A of the Hewlett Packard Co.

The simulated sum-signal and simulated difference-signal are applied to utilization equipment by means of couplers 42A and 42B. Couplers are, generally speaking, summing units, such as magic tees; and may comprise unidirectional devices that protect the simulated-signal generating-arrangement during the transmitting operation of the radar system.

The operation in the present invention is as follows. When incoming echo signals impinge onto antennas 38, the true sum-signal and the true difference-signal are applied to the utilization equipment 32. Since at this time the calibration equipment is inactivated, the couplers 42 pass the true sum-signal and the true difference-signal to the utilization equipment 32.

When the system is being calibrated, the radar system is de-activated, or else the antennas 38 are blocked. At this time the couplers 42 pass the simulated sum-signal and the simulated difference-signal to the utilization equipment 32.

Thus, the radar system may be used, or calibrated, as desired.

It was previously pointed out that the distance to the target is obtained by measuring the time interval between transmission of the radar energy and the reception of the echo signal. This can also be simulated by the apparatus of FIGURE 4.

To do so, a timing signal 46 from the utilization equipment 32 initiates the timing circuitry; and simultaneously activates a controllable delay generator 48, whose output results in simulated sum and difference signals. The time interval between the timing signal 46 and the simulated signals are measured; and thus simulates range.

Alternatively, the timing signal may be obtained from another source; and may be applied directly to the utilization equipment, and applied simultaneously to delay generator 48—thus producing a time interval that simulates a range.

The foregoing explanation has been presented in terms of acting upon the echo signal while it is of radar frequency; this approach having certain advantages.

However, there are times when it is preferable that the echo signal be converted to a lower frequency, and acted upon while in this form. In systems using this second approach, the various elements (summing and subtracting unit, switch, phase-control device, attenuator, phase shifter, etc.) take the form of well-known electronic devices and circuits.

The above explanation has, for simplicity, been presented in terms of two individual antennas positioned in a side-by-side relation, so that they give the horizontal angular orientation of a target relative to the antenna. This would be the case of a ship that is interested in detecting other ships.

In those cases where a ship or radar station is interested in detecting airplanes, a second pair of individual antennas is positioned in an above-below relation, so that they give the vertical angular orientation of a target relative to the antenna. Since the second pair of antennas also produce sum-and-difference signals, a similar calibration arrangement may be used.

Alternatively, a single calibration arrangement may be switched between the horizontal and the vertical pairs of antennas.

While the use of the invention has been described in terms of a sum-and-difference radar system, it may also be used in other radar systems.

For example, the above-described sum-and-difference radar system uses one or more pairs of antennas having lobe-like reception patterns, the antennas receiving echo signals that are operated upon simultaneously. The sumand-difference system is therefore included in the class of radar systems known as "simultaneous-lobing systems."

Other simultaneous-lobing systems use, instead of the sum and the difference of the individual signals, the actual intensity of the echo signals. In this so-called "intensity-difference" system, the utilization equipment uses the intensity difference between the individual signals to compute the direction of the target. This intensity-difference type of system also uses a power-ratio-line chart; and the above-described invention can simulate the different-intensity simultaneous-signals used by this system.

Another simultaneous-lobing radar system uses the phase of the incoming signals to find the direction of the target; and this phase-difference system uses a relative-phase chart similar to that of FIGURE 2. In order for the present invention to simulate signals for this type of radar system, the variable attenuator 34 is replaced by a variable phase-shifter; so that various relative-phases may be produced. Since most of the variable phase-shifters inherently introduce some attenuation, the compensating phase shifter 44 is replaced by a compensation attenuator.

A block diagram for producing simulated signals for a phase-difference radar system is shown in FIGURE 5.

Some radar systems, instead of processing the echo signals simultaneously, process them alternately; these systems being known as "sequential lobing" systems.

The present invention can be used with such systems by supplying the two simulated signals alternately. This result can be achieved by causing the switch to oscillate between its two settings; or by using other suitable switching arrangements in the utilizing equipment or the channels feeding signals thereto.

Thus, the present invention simulates incoming radar signals without the necessity for actually having incoming radar energy; the simulated signals being useful for calibration purposes. Moreover, the present invention provides means whereby the simulated signal may have any of its characteristics varied; the intensity-characteristic being varied by a variable attenuator; the phase-characteristic being varied by a variable phase-shifter; and the time-characteristic being varied by a delaying circuit.

Although the invention has been illustrated and described in detail, it is to be clearly understood that the same is by way of illustration and example only, and is not to be taken by way of limitation; the spirit and scope of this invention being limited only by the terms of the appended claims.

I claim:
1. The combination comprising
    a source of energy;
    a magic tee having two input ports and two output ports;
    a switch;
    means for applying energy from said source to said switch;
    means for applying energy from said switch to selected said input ports of said magic tee, depending upon the setting of said switch—whereby the output of said magic tee are two in-phase or two anti-phase signals, depending upon the setting of said switch;
    means, comprising a variable attenuator, for attenuating one of the output signals from said magic tee;
    means, comprising a phase shifter, for controlling the phase of the full-strength output signal from said magic tee;
    means for applying the phase-shifted full-strength output signal from said magic tee, to utilization equipment; and
    means for applying the attenuated signal from said variable attenuator to utilization equipment.

2. Non-radiating means for calibration of a monopulse radar system having a sum and difference microwave channel, comprising
    microwave signalling means responsive to a monopulse radar to be tested for providing a periodic pulse selectively delayed relative to the system trigger of said radar;
    a magic tee having a first and second output ports and first and second input ports;
    microwave switching means for coupling the output of said microwave signalling means to an alternative one of the input ports of said magic tee for reversing the phase sense of the output occurring at said first output port of said magic tee;
    variable attenuation means responsive to said first output port of said magic tee and adapted to being coupled to said microwave difference channel of said monopulse radar for providing a simulated microwave difference signal having a selected amplitude; and
    adjustable phase-shift means responsive to said second output port of said magic tee and adapted to be coupled to said microwave sum channel of said monopulse radar for providing a simulated microwave sum signal having a time-phase adjusted relative to that of said simulated microwave difference signal.

References Cited by the Examiner

UNITED STATES PATENTS 2,825,057   2/1958   Worthington _____ 343—16.1
3,113,312   12/1963  Begeman _____ 343—17.1

CHESTER L. JUSTUS, *Primary Examiner.*